United States Patent [19]
Bowen

[11] Patent Number: 5,247,570
[45] Date of Patent: * Sep. 21, 1993

[54] TELEPHONE ANSWERING SYSTEM AND APPARATUS FOR DIRECT CALLER SELECTION OF A PARTY LINE EXTENSION

[75] Inventor: James H. Bowen, Catharpin, Va.

[73] Assignee: Product Engineering and Manufacturing, Inc., Catharpin, Va.

[*] Notice: The portion of the term of this patent subsequent to Feb. 4, 2009 has been disclaimed.

[21] Appl. No.: 825,917

[22] Filed: Jan. 27, 1992

Related U.S. Application Data

[63] Continuation-in-part of Ser. No. 415,852, Oct. 2, 1989, Pat. No. 5,086,458.

[51] Int. Cl.$^5$ .................... H04M 1/72; H04M 13/00
[52] U.S. Cl. .................... 379/180; 379/182
[58] Field of Search ............. 379/180, 165, 179, 182, 379/373

[56] References Cited

U.S. PATENT DOCUMENTS

| | | |
|---|---|---|
| 3,515,813 | 1/1968 | Cleary . |
| 3,793,487 | 2/1974 | Kilby . |
| 4,320,256 | 3/1982 | Freeman . |
| 4,387,272 | 6/1983 | Castro et al. . |
| 4,420,656 | 12/1983 | Freeman . |
| 4,560,837 | 12/1985 | Carson et al. . |
| 4,591,664 | 5/1986 | Freeman . |
| 4,598,179 | 7/1986 | Clark et al. . |
| 4,625,079 | 11/1986 | Castro et al. . |
| 4,629,831 | 12/1986 | Curtin et al. .................... 379/213 |
| 4,675,899 | 6/1987 | Ahuja .................... 379/180 |
| 4,696,028 | 9/1987 | Morganstein et al. .................... 379/58 |
| 4,701,949 | 10/1987 | Lynch et al. .................... 379/180 |
| 4,723,271 | 2/1988 | Grundtisch .................... 379/179 X |
| 4,741,024 | 4/1988 | Del Monte et al. .................... 379/181 |
| 4,783,800 | 11/1988 | Levine . |
| 4,813,067 | 3/1989 | Hashimoto . |
| 4,910,764 | 3/1990 | Bowen .................... 379/100 |
| 4,926,467 | 5/1990 | Meier .................... 379/179 X |
| 4,974,253 | 11/1990 | Hashimoto .................... 379/100 |
| 4,998,273 | 3/1991 | Nichols .................... 379/180 |

*Primary Examiner*—Stafford Schreyer
*Attorney, Agent, or Firm*—Whitham & Marhoefer

[57] ABSTRACT

An automated telephone answering system with plug-in tone responsive unit at each of a plurality of extensions, a central answering unit responds to a caller initiated, telephone company generated, ring signal on the telephone line and establishes a connection with the calling phone. Each of the remote units responds to a different predetermined, selectable tone frequency. When the caller pushes a key on a standard Touch Tone phone key pad to select a specific extension, the responding remote unit generates a ringing signal for that extension. If the telephone line has an on-hook status, the system has means that prevents response to further tone signals.

22 Claims, 4 Drawing Sheets

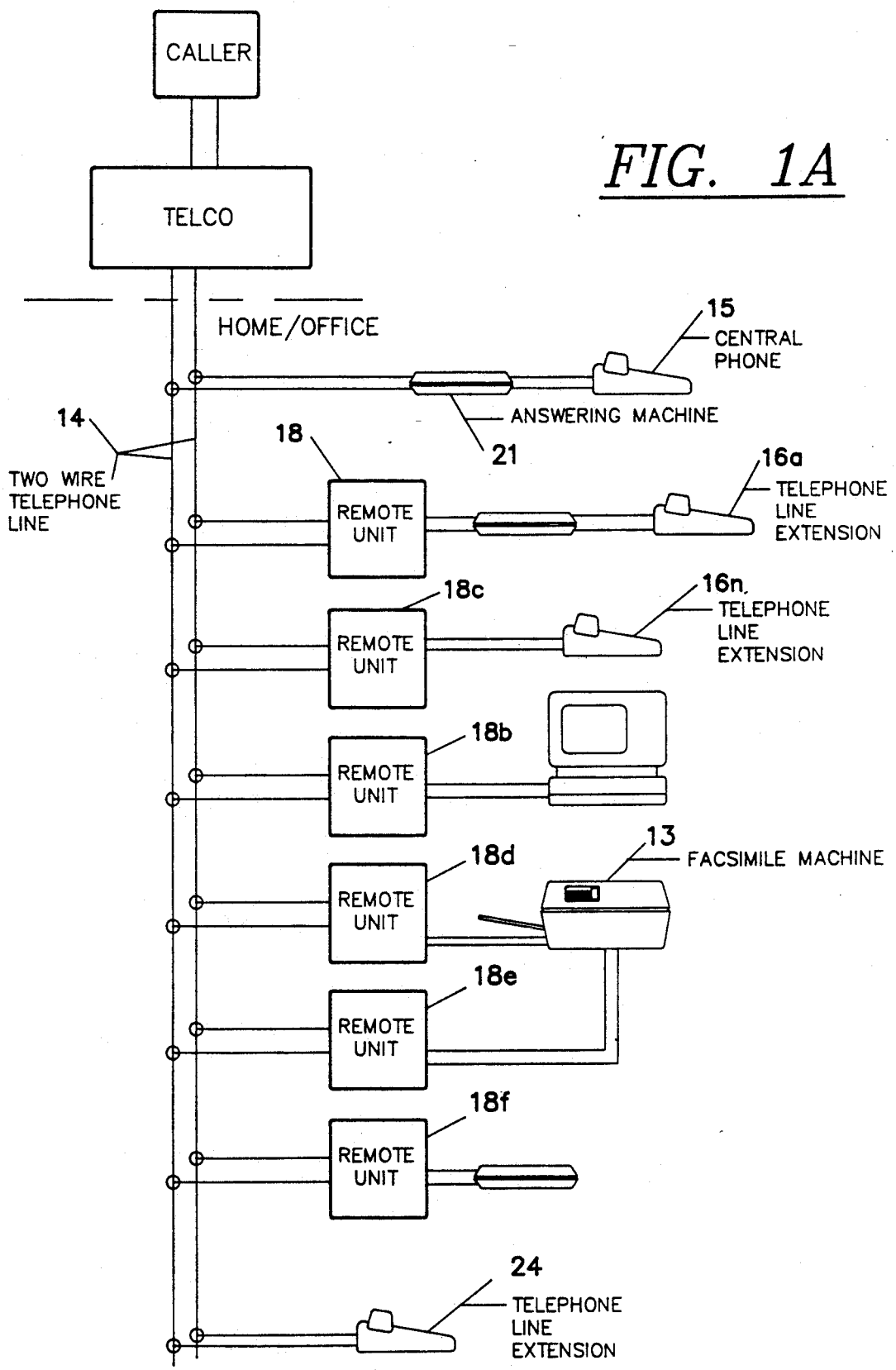

TELEPHONE ANSWERING SYSTEM AND APPARATUS FOR DIRECT CALLER SELECTION OF A PARTY LINE EXTENSION

CROSS REFERENCE TO RELATED APPLICATION

This application is a continuation-in-part of U.S. patent application Ser. No. 07/415,852, filed on Oct. 2, 1989 U.S. Pat. No. 5,086,458.

BACKGROUND OF THE INVENTION

1. Field of the Invention

The present invention generally relates to telephone answering systems, and more particularly to an economical system which allows direct caller selection of a line extension.

2. Description of the Prior Art

There are a number of telephone call answering systems in the prior art which allow a caller to choose to be connected to a specific telephone extension by pushing one or more keys on a standard tone generating key pad after dialing the basic number. U.S. Pat. No. 4,591,664 is one example of such prior art systems. These systems, while generally satisfactory in operation, are relatively costly to install as they connect through a central unit to the extension phone.

SUMMARY OF THE INVENTION

It is therefore an object of the present invention to provide a plug-in call answering system which allows caller selection of an extension without special wiring to the extension.

Another object is the provision of a plug-in system that can be used in premises with an installed multi-extension phone-line system without any rewiring. The system can be used with multiple phone extensions or computers connected via modem to the phone line, and directly addressed from the incoming calling party without having dedicated phone lines and without special wiring to each modem.

Briefly, this invention contemplates an automated telephone answering system with a plug-in tone responsive unit at each of a plurality of extensions. A central answering unit responds to a caller initiated, telephone company generated, ring signal on the telephone line and establishes a connection with the calling phone. Each of the remote units responds to a different predetermined, selectable tone frequency. When the caller pushes a key on a standard Touch Tone phone key pad to select a specific extension, the responding remote unit generates a ringing signal for that extension. If the telephone line has an on-hook status, the system has means that prevents response to further tone signals.

BRIEF DESCRIPTION OF THE DRAWINGS

The foregoing and other objects, aspects and advantages will be better understood from the following detailed description of a preferred embodiment of the invention with reference to the drawings, in which:

FIG. 1A is a block diagram of an optional connection of FIG. 1 of a telephone answering system in accordance with the teaching of this invention.

DETAILED DESCRIPTION OF A PREFERRED EMBODIMENT OF THE INVENTION

Figure 1:
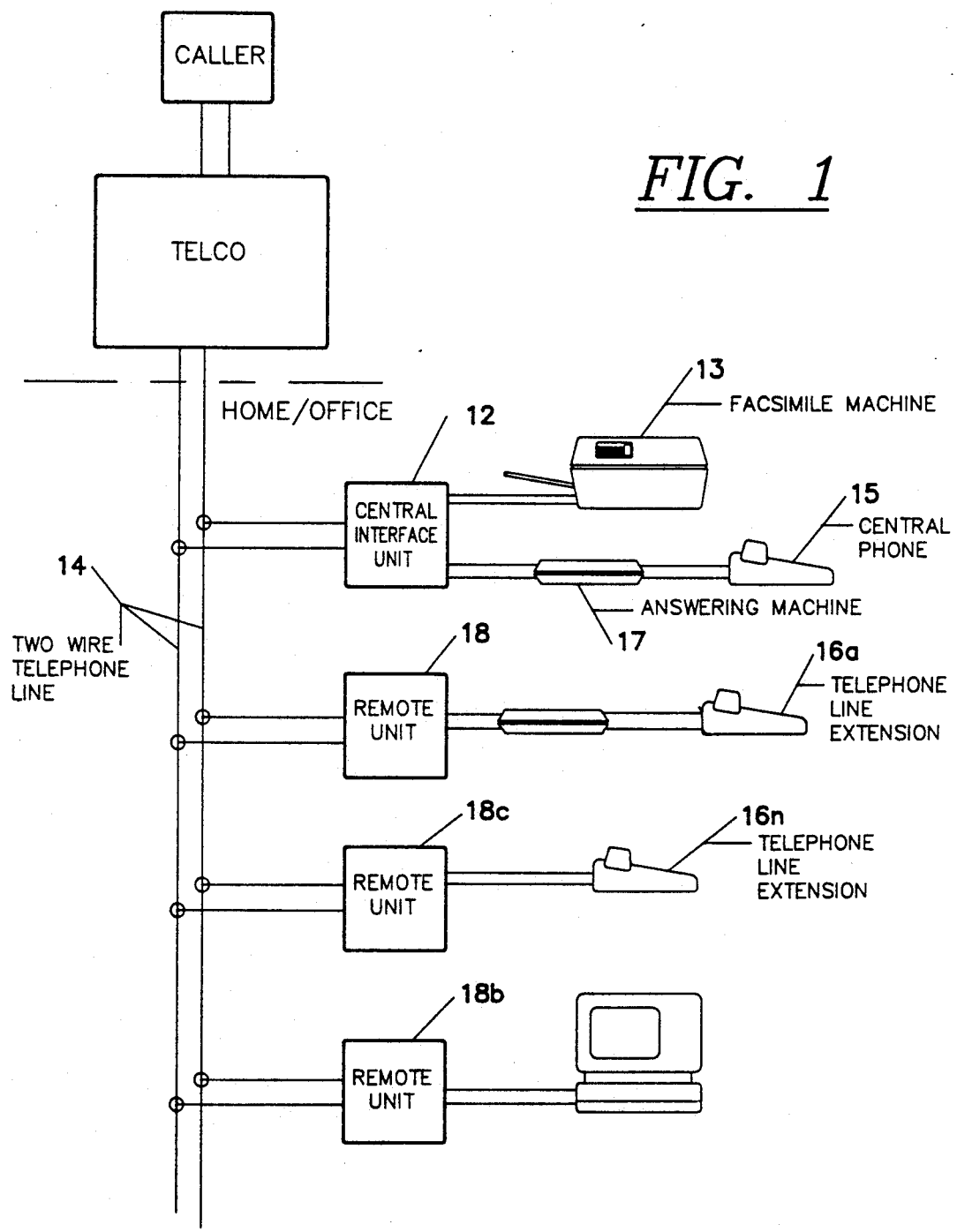
FIG. 1 is a block diagram of a telephone answering system in accordance with the teachings of this invention.

Referring now to the drawings, in which the same reference numeral indicates the same element in the various figures, FIG. 1 shows a central telephone answering and interface unit 12 which may be the unit described in my co-pending application Ser. No. 07/337,480 filed Apr. 13, 1989 now U.S. Pat. No. 4,910,764, entitled "Facsimile and Voice Communications Interface Device" or the central unit described herein. The central answering unit 12 is coupled to a conventional two-wire telephone line 14; the connection can be, and typically will be, made inside the premises of a user by plugging a standard telephone cable from the unit 12 into a standard telephone outlet jack. Advantageously, a central phone 15 and an answering machine 17 are connected to the central unit 12. A facsimile machine 13 may also be coupled to the central unit 12.

A number of telephone line extensions 16a through 16n are coupled to the line 14 in parallel with the central unit 12 and with each other. Each extension 16 is plugged into a respective remote unit 18 which in turn is plugged into the line 14. Standard connectors and jacks may be used both to couple an extension to its remote unit and to couple the remote unit to the line. The telephone installation illustrated is typical of a multiple extension system in a private household, a small business, or a dormitory.

Figure 3:
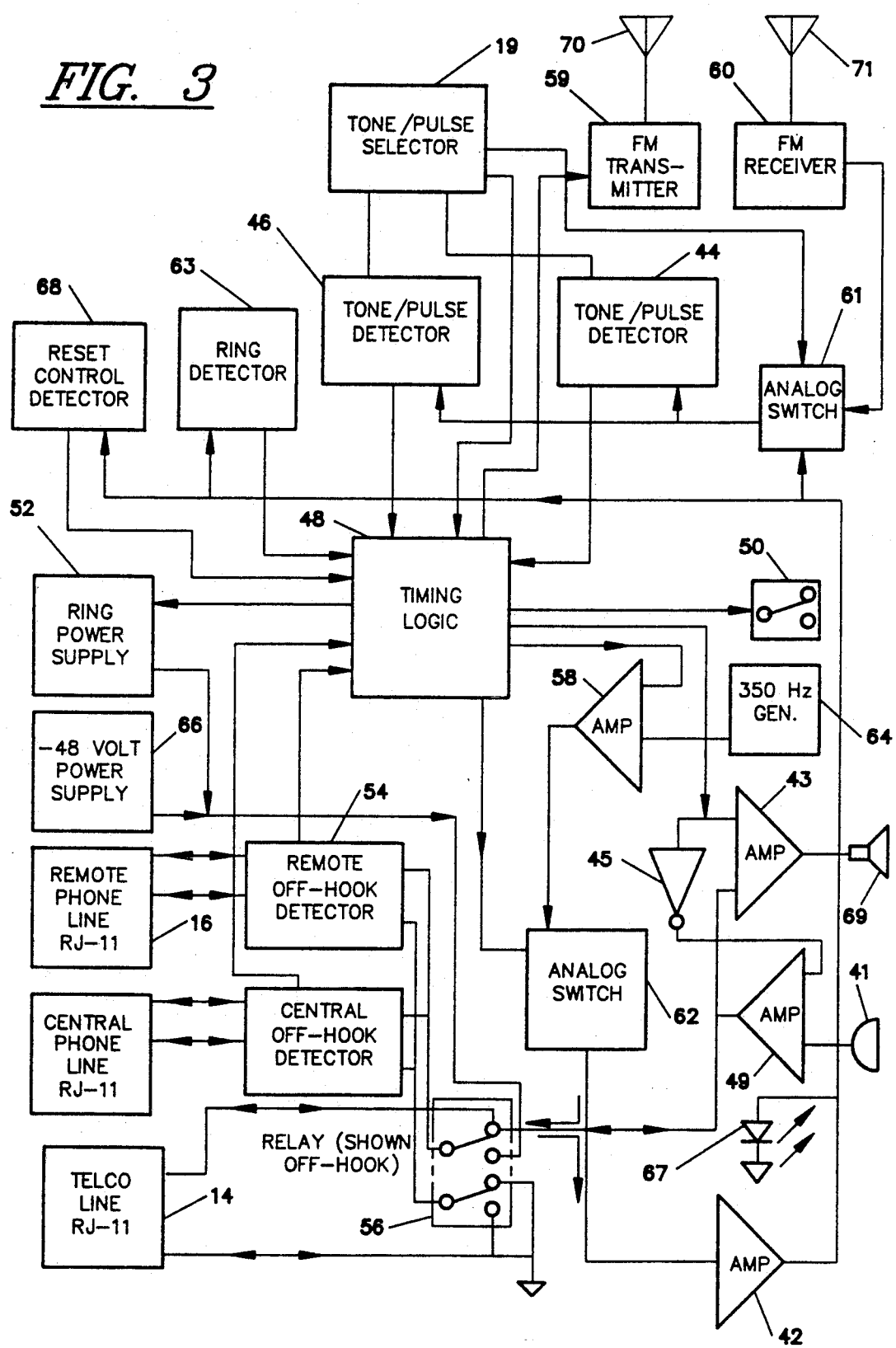
FIG. 3 is a block diagram of a plug-in central and remote unit in accordance with the teachings of this invention.

Each remote unit 18 has a set of switches 19, as described more fully in connection with FIG. 3, which are used to select a specific frequency or pulse dialing codes of a standard telephone tone signal, or to other specific frequencies to which it will respond. The switches may be manually operable or responsive to code signals on the telephone line. In a specific embodiment, each remote unit is capable of responding to the tone frequencies generated when any one of the keys or a combination of keys are pushed by a caller or by other generating means. In an illustrative embodiment, each remote unit may be set to respond to 1, 2, 3, 4, 5, 6, 7, 8, 9, *, #, and 0 or to receive pulse dialing codes. The switches 19 are set so that each remote unit will respond to only a select one or set of tones or codes generated in response to one of these keys or by other generating means.

As previously explained, the apparatus disclosed in my co-pending application may be used as the central answering unit 12 in the practice of this invention. The specification of this co-pending application, which is incorporated herein by reference, discloses a system which, among other things, serves to automatically detect a facsimile signal on the incoming line and direct a call to a facsimile machine. Such a feature may advantageously be incorporated in the system of this invention. However, facsimile is not necessary to the practice of this invention.

FIG. 1A shows a central answering unit being an answering machine. It is appreciated that this answering machine is a standard one manufactured by a number of companies. In this optional connection the answering machine answers the incoming call and gives a voice response telling the caller either which number corresponds to each extension, "sales is on 22, accounting is on 33, the facsimile is on 44", or in a residence that could have a limited message to only let the callers that know the different telephone extensions be connected, and that all others only leave a message on the answering machine. The central phone 15 is the same as in FIG. 1.

Remote unit 18d in this teaching has its switches 19 set for the CNG tone of 1100 Hz. This allows the facsimile 23 to receive automatic facsimile transmissions from the callers with automatic sending features on their facsimile machines. Remote 18d can also be set to the other tones by switches 19 as described herein so a manual reception of a facsimile can be made by a caller pressing the appropriate extension number.

Remote unit 18e in this teaching can have equipment connected like facsimile 13 to control the on and off time of the equipment power.

Remote unit 18f in this teaching is only connected to an answering machine to be used in a voice-mail type application where one to many remote units are connected to an answering machine.

All remote units 18 can have speakers and microphones to have one or two-way conversations without having the called party lift the hand set.

Figure 2:
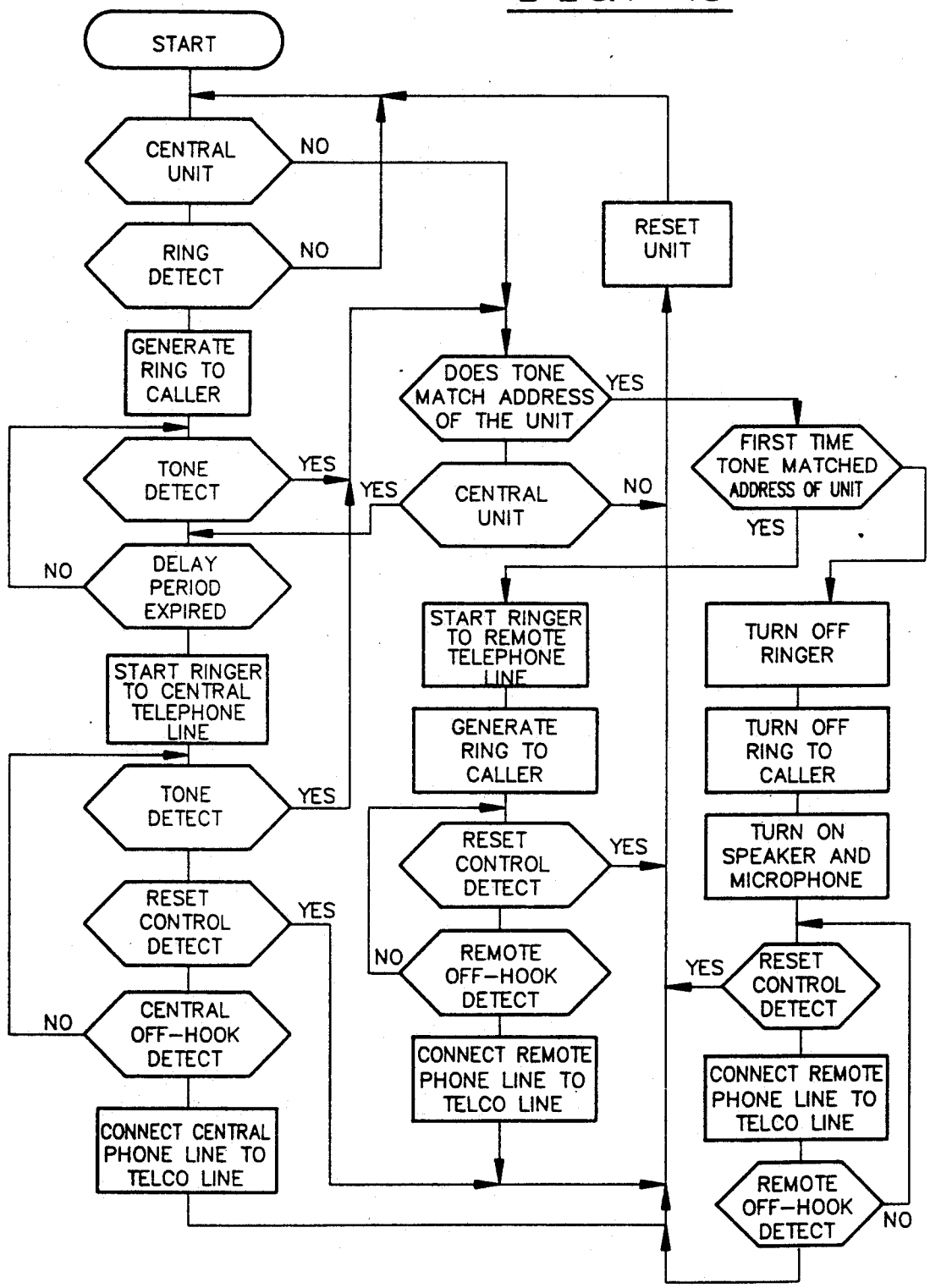
FIG. 2 is a flow diagram illustrating the functions of a system in accordance with the teachings of this invention.

FIG. 2 is a flow diagram of functions specific or particularly advantageous to the operation of this invention.

The basic central unit functions include answering the call and generating a tone which will be heard by the caller. The central unit functions are diagrammed on the left-hand side of FIG. 2. The remote unit functions include listening for a certain caller generated tone and, in response thereto, generating a ring signal for the caller selected phone. These functions are diagrammed on the right-hand side of FIG. 2.

Starting with the central unit functions, if a ring is detected, operating in a CENTRAL UNIT mode, the unit "answers" the incoming call and generates a RING TO CALLER signal. This signal may be similar to the ringing signal the telephone company generates for the caller, but preferably at a distinctive pitch. In an installation in which there are two or more units which have both central and remote function capability, the central function capability would ordinarily be disabled in all but one unit. Operating only as a remote unit, as indicated by NO at the CENTRAL UNIT functional block, the initial function of the unit is to monitor the line and respond to a selected signal on the line.

In this two function unit, the next functional step is TONE DETECT. TONE DETECT detects a caller generated signal to select a particular extension. As previously explained, the tone would typically be generated by the caller pushing one or more keys of a Touch Tone telephone. Of course the system could be responsive to any suitable tones. The next function is DOES TONE MATCH ADDRESS OF THE UNIT in which the one is compared to the frequency for which the particular unit is set to respond and which will be explained in connection with the remote unit operation.

If a remote extension is not picked up within a delay period established by the DELAY PERIOD EXPIRED function, a locally generated ring signal is connected to the central telephone instrument 15 or answering machine 17 as indicated in the START RINGER TO CENTRAL TELEPHONE LINE functional box. During this time the unit can continue to listen for a caller generated signal as indicated in the TONE DETECT functional box.

The RESET CONTROL DETECT function resets the central unit functions when a caller hangs up without completing the call or when an extension completes the call. A dial tone signal may be used to activate the reset function. However, it should be noted that other suitable tone or current signals may be used.

The system senses an off-hook condition of the central line at CENTRAL OFF-HOOK DETECT, and when this condition is detected, the central line is connected to the telephone line 14; the CONNECT CENTRAL PHONE LINE TO TELCO LINE function.

The functions of the remote unit are diagrammed on the right-hand side of FIG. 2. The remote unit functions to connect an extension to the line in response to a caller generated signal. If the central function apparatus and the remote function apparatus are provided for each extension, the central function apparatus would be disabled for all but one unit, as indicated by the function box CENTRAL UNIT. Functioning only as a remote unit the line 14 is monitored for a caller generated signal that matches the signal for which the unit is set to respond. When a matching signal is detected at DOES TONE MATCH ADDRESS OF UNIT it then tests to see if it is the first time that the tone has matched the address of the unit in FIRST TIME TONE MATCHED ADDRESS OF UNIT. If it is the first time, then it activates a local ringer for the selected extension at START RINGER TO REMOTE TELEPHONE LINE. At this point a RING TO CALLER is generated to let the caller know that they have connected with the proper remote 18. If the extension is picked up, the off-hook condition is detected at REMOTE OFF HOOK DETECT and the extension is connected to line 14 at CONNECT REMOTE PHONE LINE TO TELCO LINE.

When a call is in progress the line 14 is connected to the appropriate extension or central line. When the call is completed the RESET Unit sets the line to an on-hook status.

If at the logic step FIRST TIME TONE MATCHED ADDRESS OF THE UNIT it is the second time the tone has matched the units address then at TURN OFF RINGER the ringer to the remote telephone line is turned off, then the ring to caller is turned off in TURN OFF RINGER TO CALLER and the speaker and microphone are turned on in TURN ON SPEAKER AND MICROPHONE. A test is made to see if the dial tone or other reset signal is detected at RESET CONTROL DETECT. The remote unit is then connected to the telephone line at CONNECT REMOTE PHONE LINE TO TELCO LINE. A test is then made to see if the remote unit is off hook at REMOTE OFF-HOOK DETECT. If the RESET CONTROL DETECT or REMOTE OFF-HOOK DETECT test is yes, then the remote unit resets.

Referring now to FIG. 3, the remote unit 18 monitors the line 14 continuously. An amplifier 42 couples the line 14 to an activity sensing LED 67 and to a pair of tone detectors 44 and 46. For example, detector 44 could be set to receive the ones, but not limited to tones of 697, 770, 852 and 941 Hz, and detector 46 is responsive, but not limited to tones of 1336, 1477 and 1209 Hz. It will be appreciated that these tone detectors in this example could be set to receive the tones, but not limited to signals generated by pushing buttons 1, 2, 3, 4, 5, 6, 7, 8, 9, *, #, and 0 on a Touch Tone phone. The selector switch 19 provides a selectable bias input to detectors 44 and 46 so that they will respond only to a predetermined single tone, tone pair or plurality of tones and a string of tones, i.e., 4, 42, 424, 6187, etc., on line 14.

When the unit is used as a central unit switches 19 can be set to activate a FM transmitter 58 so the tones coming from line 14 can be received and then FM modulated for FM transmission of a corresponding frequency and then transmitted out to be received by the remote unit or units. This transmission can be either through antennas 70 and 71, the input power line or line 14. The remote units can be set by switches 19 that direct the tone via analog switch 61 to receive either the FM transmission from the receiver 60 or by the tones from line 14.

The standard −48 volt DC on line 14, signaling an on-hook line condition is used to bias the detectors 44 and 46 so that they are unresponsive to tones on the line when the line is in an on-hook condition, at this time only, the ring detector 63 is in the active state or ready to detect a ring signal. When the central unit 12 completes a call, the impedance of line 14 drops and the bias drops to the range of 3–6 volts DC, rendering the detectors 44 and 46 responsive to tones on the line.

In response to an output from the tone detectors 44 or 46, timing logic 48 generates an output which is coupled to a ring signal generator 52. The ring signal generator may be a standard signal of 90 volts 16–20 Hz, modulated on for approximately two seconds and off for approximately four seconds. A −48 volt DC power supply 66 is needed to make a residence phone operate, so when it goes off-hook this can be detected. A ringing signal is coupled to phone 16, causing it to ring.

An off-hook detector 54 detects an off-hook condition of attached phone 16 and, in response to an off-hook condition, operates a relay 56 which disconnects the ring signal from the phone 16. Off-hook detector 54 also transmits an off-hook signal to timing logic 48. In response to this input the timing logic couples outputs to an amplifier 58 and an analog switch 62 which in response couples a tone generator 64 (e.g., 350 Hz) to the line 14 for a short intervals (e.g., 150 milliseconds). This signal is detected by the reset control detector 68 of the central unit 12; this tone or a current change in the telco line resets the central unit and terminates the ring-back signal to the caller. It will be appreciated that this short reset control signal can appear on line 14 whenever any of the extensions 16 initially goes off-hook, thus signaling a previous off-hook extension that another extension has come on the line. Likewise LED 67 monitors activity on the line to also show other extensions that someone is on the line.

At the end of a phone conversation, the phone 16 is placed on-hook. The off-hook detector 54 causes relay 56 to switch to its on-hook position, breaking the connection to the phone and coupling a −48 volt DC supply 66 to the phone so an off-hook condition can be detected.

In placing an outgoing call, the off-hook detector 54 operates the relay 56, connecting the extension 16 to the line 14. A reset control detector 68 detects the dial tone on the line 14 and generates an output which is coupled to the timing logic 48 to inhibit outputs from the timing logic 48 in response to detected tones generated by the outgoing call. If the timing logic 48 has enabled the ring generator power supply 52, an output from detector 68 causes termination of the ring signal.

In operation, as shown in FIG. 1, a caller will know the number of the extension he or she wants to reach. The caller dials a seven digit number identifying line 14. The central unit 12 completes the call and generates a ringing tone which the caller hears, but preferably at a pitch discernibly different from the ring tone generated by the phone company. The caller then pushes the keys on his or her Touch Tone key pad corresponding to the extension he or she wants to reach. The called party, by use of switches 19, has the option to transmit the tones to the remote units 18 through line 14, or through FM transmitter 59. When a remote unit 18 detects the tone on line 14 or from FM transmitter 60 for which it is set, it generates a ringing signal at that extension. When that extension, or any extension, is picked up, the remote unit generates a reset control signal for a short interval which resets the central unit and terminates the ringing tone on the line. If an extension other than the one selected by the caller picks up the phone, a reset control signal generated by the remote unit for the picked-up phone resets the central unit. In addition, this reset control signal is detected by the selected remote unit and that remote unit terminates the ringing signal to the selected extension.

If one of the extensions does not complete the call within a predetermined interval (e.g., two or three rings) the central unit responds by transferring the call to a central unit, such as a central phone extension or answering machine, or both in succession.

In receiving a call, if the same code is pressed by the caller after the ringing starts, then the ringer stops and the timing logic 48 turns on op amp 43 in which the on time of each alternates through inverter 45 with op amp 49. While op amp 43 is turned on the caller can speak and when op amp 49 is turned on the called party can speak without having to lift the hand set. To terminate the conversation the caller can hang up, at which time the dial tone resets the unit, or the called party can pick up the hand set and then replace it, which would reset the unit.

Relay 50 operates with the speaker and microphone, in as much as if the second code that is pressed by the caller is the same as the first time, the relay changes states. Each time the correct code is pressed by the caller, relay 50 changes states; either from the normally open or from the normally closed position.

In operation, as shown in FIG. 1A, the caller dials a seven digit number identifying line 14. The answering machine 21 completes the call and gives the appropriate outgoing message. The caller then pushes the keys on his or her Touch Tone pad corresponding to the extension he or she wants to reach. When a remote unit 18 detects the tone or pulse dialing code on line 14 for which it is set, it generates a ringing signal at that extension and generates a ring to caller tone which the caller hears.

When that extension is picked up, that extension by being off-hook resets the answering machine. If an extension other than the one selected by the caller and is connected to a remote unit picks up the phone, a reset control signal generated by that remote unit is detected by the selected remote unit that terminates the ringing signal to that selected extension.

If any extension 24 is picked up that is not connected to a remote unit, then the off-hook condition is detected by the reset control detector in the selected remote unit and the ring signal is terminated. If the off-hook condition is not detected, the remote unit will only ring a predetermined number of times, i.e., five times. If the called party does not pick up the call then a message can be left on the answering machine 21. Upon the calling party hanging up, the dial tone is detected by the reset control detector and resets the selected remote unit.

If a caller wants to call from within the residence they can call any remote unit from phone 16 or phone 24 by picking up the hand set and dialing any of the remote unit 18 extension numbers.

During a call between the calling party and the called party, another remote unit or any number of remote units can be added to the call by selecting the remote units extension number. This selection can be made by the called party or the calling party. If the calling party wants to talk to two or more extensions, they can press the extension numbers in succession and have as many remotes as connected all ring at the same time.

When using the remote unit to monitor a room or to receive a telephone call without the called party having to pick up the hand set. The calling party need only to press the extension number twice. Then a one-way or two-way conversation with a sick person or anyone that does not want to pick up the hand set from the next room or from the next state can be made.

When using the remote unit to turn off and on equipment the relay is actuated with the speaker and the microphone so the caller can hear the equipment turn on or off. It is appreciated that some equipment cannot be heard so the speaker and microphone are not always necessary in this application.

While the invention has been described in terms of a single preferred embodiment, those skilled in the art will recognize that the invention can be practiced with modification within the spirit and scope of the appended claims. Although the unit described is with discrete components, it should be noted that those skilled in the art could also implement in software. It should also be noted to those skilled in the art that signaling via FM transmission to select the different remote units could also carry the calling and called parties voice or other transmission, so no telephone lines would be needed between remote units and the central unit.

Having thus described my invention, what I claim as new and desire to secure by Letters Patent is as follows:

1. An automated telephone answering system for telephone extensions coupled in parallel on a line, comprising in combination;
   an answering machine for responding to incoming calls;
   means for coupling said answering machine to said line;
   a plurality of remote units;
   means for coupling each of said units to said line;
   means to couple a telephone extension to each of said remote units;
   said remote units each having means to detect a plurality of caller generated signals;
   said remote units each having means to select at least one of said signals for response by said each remote unit;
   each of said remote units including ring signal generating means;
   each of said remote units including means to couple said ring signal generating means to an extension coupled thereto in response to a tone for which it has been selected to respond; and
   means to inhibit response to said selected signal if said line has an on-hook status signal thereon.

2. An automated telephone answering system as in claim 1, wherein said caller generated signal is a pulse dialing signal.

3. An automated telephone answering system as in claim 1, further including means incorporated in each of said remote units to indicate that an extension coupled to another remote unit is coupled to said line.

4. An automated telephone answering system as in claim 2, further including means incorporated in each of said remote units to indicate that an extension coupled to another remote unit is coupled to said line.

5. An automated telephone answering system as in claim 1, wherein at least one of said plurality of remote units can be set to respond to an 1100 Hz signal.

6. An automated telephone answering system as in claim 1, wherein said means to inhibit a response to said selected signal inhibits said response for only a predetermined interval.

7. An automated telephone answering system as in claim 1, including means to place an extension for a remote unit in an off-hook status in response to a repetition of said caller generated signal for which said remote unit has been selected to respond.

8. An automated telephone answering system as in claim 7, further including a speaker connected to said extension.

9. An automated telephone answering system as in claim 7, further including a microphone connected to said extension.

10. An automated telephone answering system as in claim 8, further including a microphone connected to said extension.

11. An automated telephone answering system as in claim 7, further including a control relay connected to said extension.

12. An automated telephone answering system for telephone extensions coupled in parallel on a line, comprising in combination;
    a central unit for responding to incoming calls, said central unit including means for generating and means for transmitting a selected one of a plurality of radio frequency signals in response to a caller generated signal on said line;
    means for coupling said central unit to said line;
    a plurality of remote units;
    means for coupling each of said units to said line;
    means to couple a telephone extension to each of said remote units;
    said remote units each having means to receive said plurality of radio frequency signals;
    said remote units each having means to select at least one of said radio frequency signals for response by said each remote unit;
    each of said remote units including ring signal generating means;
    each of said remote units including means to couple said ring signal generating means to an extension coupled thereto in response to a tone for which it has been selected to respond; and
    means to inhibit response to said selected signal if said line has an on-hook status signal thereon.

13. An automated telephone answering system as in claim 12, wherein said caller generated signal is a pulse dialing signal.

14. An automated telephone answering system as in claim 12, further including means incorporated in each of said remote units to indicate that an extension coupled to another remote unit is coupled to said line.

15. An automated telephone answering system as in claim 13, further including means incorporated in each of said remote units to indicate that an extension coupled to another remote unit is coupled to said line.

16. An automated telephone answering system as in claim 12, wherein at least one of said plurality of remote units can be set to respond to an 1100 Hz signal.

17. An automated telephone answering system as in claim 12, wherein said means to inhibit a response to said selected signal inhibits said response for only a predetermined interval.

18. An automated telephone answering system as in claim 12, including means to place an extension for a remote unit in an off-hook status in response to a repetition of said caller generated signal for which said remote unit has been selected to respond.

19. An automated telephone answering system as in claim 18, further including a speaker connected to said extension.

20. An automated telephone answering system as in claim 18, further including a microphone connected to said extension.

21. An automated telephone answering system as in claim 19, further including a microphone connected to said extension.

22. An automated telephone answering system as in claim 18, further including a control relay connected to said extension.

* * * * *